United States Patent
Herman et al.

(10) Patent No.: US 8,424,727 B2
(45) Date of Patent: Apr. 23, 2013

(54) MATERIAL DISPENSING ASSEMBLY

(75) Inventors: Timm Herman, Eillicottville, NY (US); Kevin Whited, Ellicottville, NY (US)

(73) Assignee: Meritool LLC, Ellicotville, NY (US)

( * ) Notice: Subject to any disclaimer, the term of this patent is extended or adjusted under 35 U.S.C. 154(b) by 559 days.

(21) Appl. No.: 12/434,024

(22) Filed: May 1, 2009

(65) Prior Publication Data

US 2009/0272767 A1 Nov. 5, 2009

Related U.S. Application Data

(60) Provisional application No. 61/050,406, filed on May 5, 2008.

(51) Int. Cl.
*B65D 35/30* (2006.01)
*B65D 35/28* (2006.01)
*B65D 35/56* (2006.01)
*B65D 88/62* (2006.01)
*B65D 88/60* (2006.01)
*B65D 88/58* (2006.01)

(52) U.S. Cl.
USPC ............ 222/327; 222/95; 222/105; 222/325; 222/333; 222/386.5; 222/390

(58) Field of Classification Search ............... 222/95, 222/105, 325–327, 333, 386, 386.5, 390 222/391
See application file for complete search history.

(56) References Cited

U.S. PATENT DOCUMENTS

| | | | |
|---|---|---|---|
| 2,138,045 A * | 11/1938 | Seeberger ................. | 74/148 |
| 3,997,085 A | 12/1976 | Lindquist | |
| D285,895 S | 9/1986 | Cox | |
| 4,741,462 A * | 5/1988 | Schneider, Jr. .......... | 222/386 |
| 4,744,494 A * | 5/1988 | Seager et al. ............ | 222/391 |
| 4,776,458 A | 10/1988 | Summons et al. | |
| 4,854,485 A * | 8/1989 | Collins .................... | 222/386 |
| 5,027,984 A | 7/1991 | Gakhar et al. | |
| 5,390,831 A | 2/1995 | Schneider | |

(Continued)

FOREIGN PATENT DOCUMENTS

EP 0267750 A2 5/1988

OTHER PUBLICATIONS

International Search Report and Written Opinion; Application No. PCT/US2009/042679, Mailed on Jun. 17, 2009, 11 pages.

(Continued)

*Primary Examiner* — Darren W Gorman
(74) *Attorney, Agent, or Firm* — Tarolli, Sundheim, Covell & Tummino L.L.P.

(57) ABSTRACT

A material dispensing assembly (100) and method of operation is disclosed for converting a portable cartridge dispensing tool to a bag-type dispensing tool. The assembly comprises a single piece piston (110) for advancing material though a material housing (104), the single piece piston (110) includes a substantially square-shaped receptacle (140). The assembly further comprises a square shaped drive rack (112) for attaching to the piston (110) at the substantially square-shaped receptacle (140) at a connection end (128). The drive rack (112) further comprises a plurality of teeth (142) located thereon. The assembly (100) further has a support (127) with a substantially square profile for receiving and supporting the drive rack (112) during operation such that the construct of the drive rack and piston (110) are prevented from rotating during operation.

18 Claims, 6 Drawing Sheets

U.S. PATENT DOCUMENTS

| | | | |
|---|---|---|---|
| 6,701,828 B1 * | 3/2004 | Burns et al. | 99/450.2 |
| 6,712,245 B2 * | 3/2004 | Barrett | 222/386 |
| 6,981,621 B2 | 1/2006 | Brandeis et al. | |
| 2004/0007598 A1 | 1/2004 | Barrett | |
| 2006/0091158 A1 * | 5/2006 | Coker et al. | 222/327 |
| 2007/0068973 A1 | 3/2007 | Herman | |
| 2008/0197154 A1 | 8/2008 | Herman | |

OTHER PUBLICATIONS

Chinese Search Report and English Translation, dated Aug. 31, 2012, Application No. 200980123059.7, 18 pages, May 4, 2009.

8 Photographs of a Piston Assembly that was on sale more than one (1) year before the provisional filing date of May 5, 2008 from which priority is claimed by this application; 8 pgs.

* cited by examiner

MATERIAL DISPENSING ASSEMBLY

CROSS-REFERENCE TO RELATED APPLICATION

The present application claims priority to currently pending U.S. Provisional Application Ser. No. 61/050,406 that was filed on May 5, 2008 and entitled MATERIAL DISPENSING ASSEMBLY. The present application claims priority the above-identified provisional patent application, which is incorporated in its entirety herein by reference for all purposes.

TECHNICAL FIELD

The present disclosure relates to a material dispensing assembly, and more particularly, a material dispensing assembly for sausage or bag-type dispensing tools.

BACKGROUND

Figure 1:
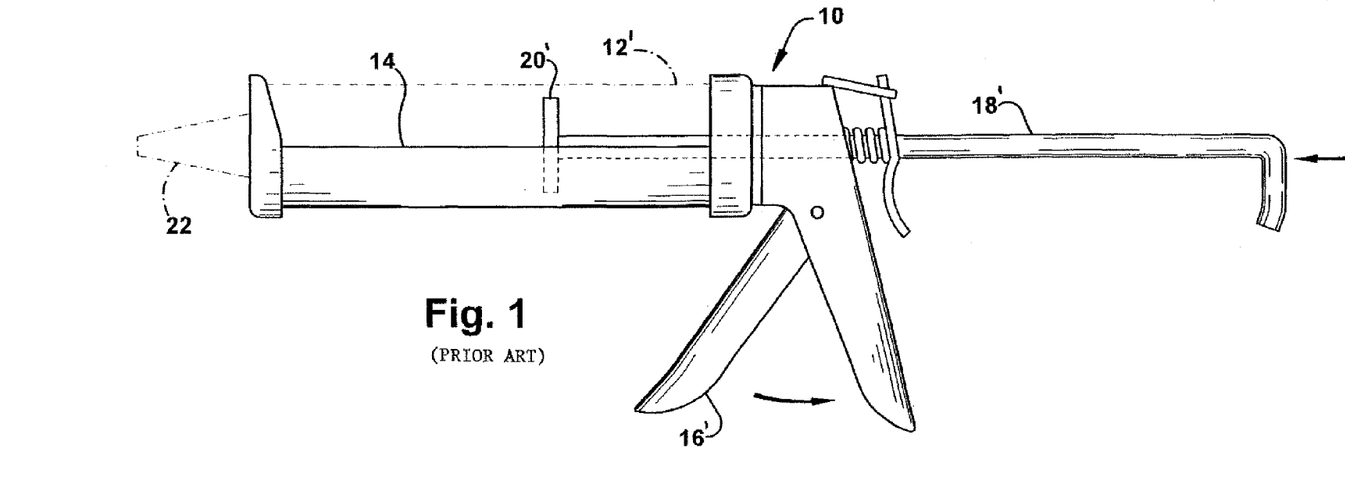
FIG. 1 is a side elevation view of a manual dispensing gun adapted for a cartridge-type material container.
Figure 2:
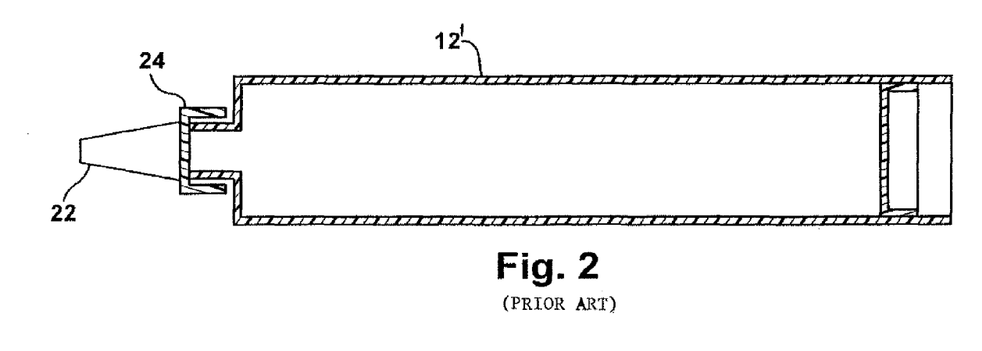
FIG. 2 is a side cross sectional elevation view of a cartridge-type material container for use in a manual or powered dispensing gun.

Dispensing tools have been available for a number of years, assisting in the application of material to a desired surface in residential, commercial, or manufacturing environments. Such materials include, for example, adhesives, lubricants, and sealants such as, silicone, urethanes, and caulk. Conventional dispensing tools frequently visualized are of the type of a handheld caulk gun 10, as illustrated in FIG. 1. Cartridges 12' shown in FIG. 2 having any number of different types of materials, including those listed above are inserted into a cartridge support sleeve 14 located on the top side of the dispensing tool 10. A trigger 16' on the gun 10 when actuated drives a rack 18' having a plunger 20' that engages the material located in the cartridge 12' such that each actuation of the trigger, forces material to be dispensed from a nozzle 22 located at an end 24 of the cartridge.

Figure 3:
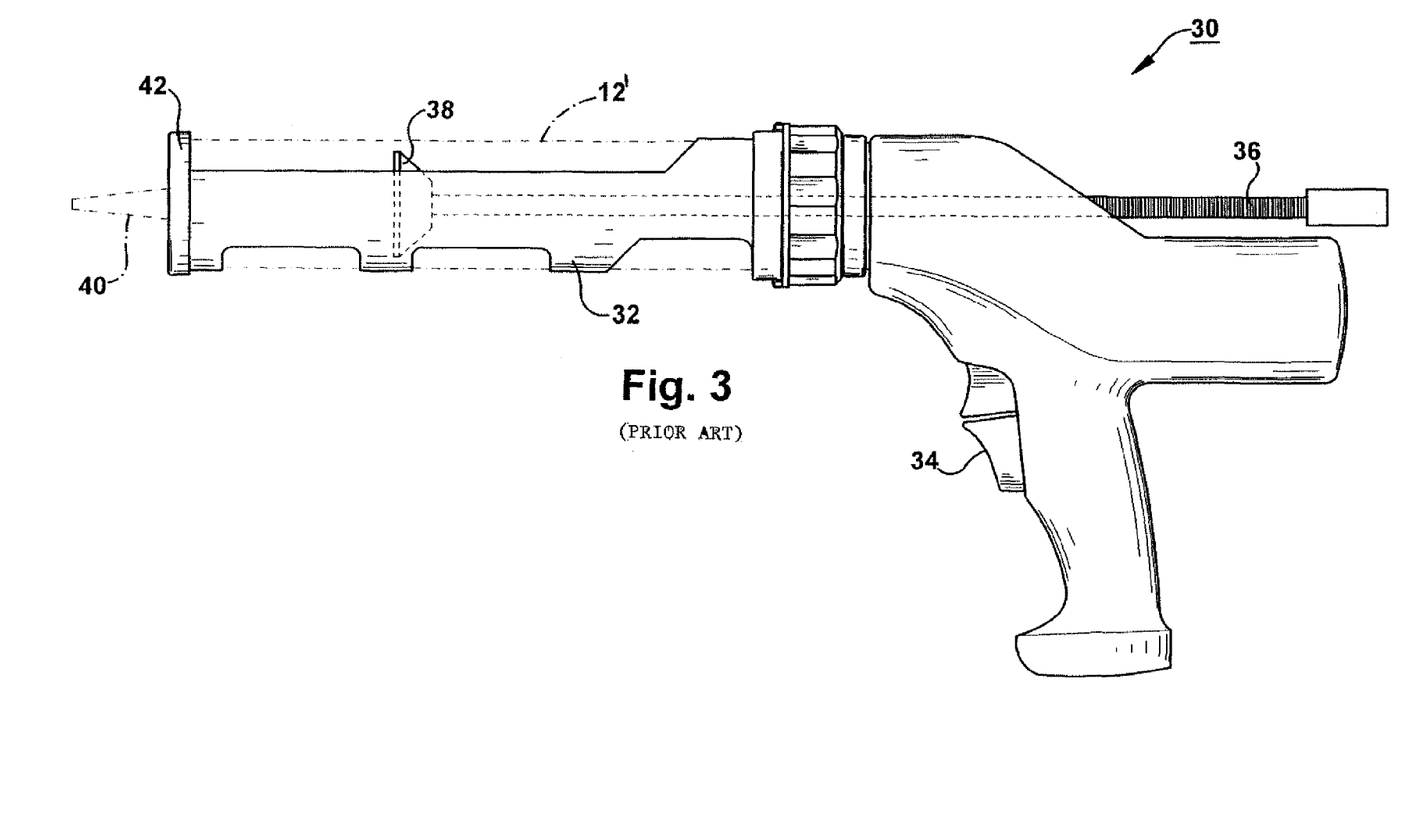
FIG. 3 is a side elevation view of a power dispensing gun adapted for a cartridge-type material container.

A more modern dispensing tool for applying various materials, including those materials listed above is a power dispensing gun 30, having a battery, pneumatic, or other means for powering motor for portable use is illustrated in FIG. 3. The power dispensing gun 30 is also capable of using the cartridges 12 filled with dispensing material by inserting the cartridges 12 into a support sleeve 32 located on the top of the power dispensing gun 30. A trigger 34 on the power dispensing gun 30 is actuated, driving a rack 36 having a plunger 38 that engages the material located in the cartridge 12 such that each actuation of the trigger forces material to be dispensed from a nozzle 40 located at the end 42 of the gun. Further details of the operation and configuration of a power dispensing gun is explained in U.S. patent application Ser. No. 11/918,689 entitled POWERED DISPENSING TOOL AND METHOD FOR CONTROLLING SAME that is assigned to the assignee of the present invention and is incorporated herein by reference in its entirety for all purposes.

Figure 4:
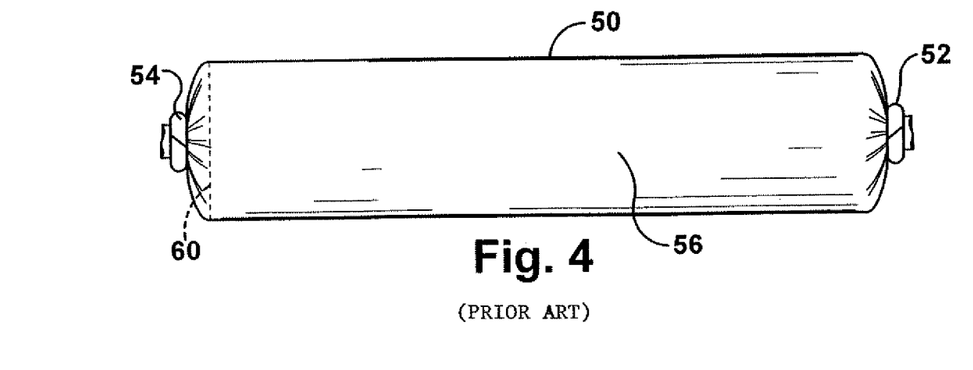
FIG. 4 is a side elevation view of a sausage pack material container for use in a manual or powered dispensing gun.
Figure 5:
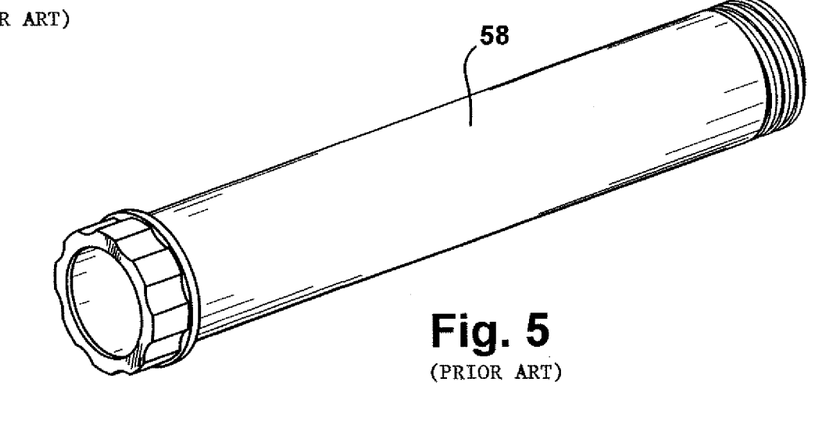
FIG. 5 is a perspective view of a tube for housing a sausage pack material container of FIG. 4.
Figure 7:
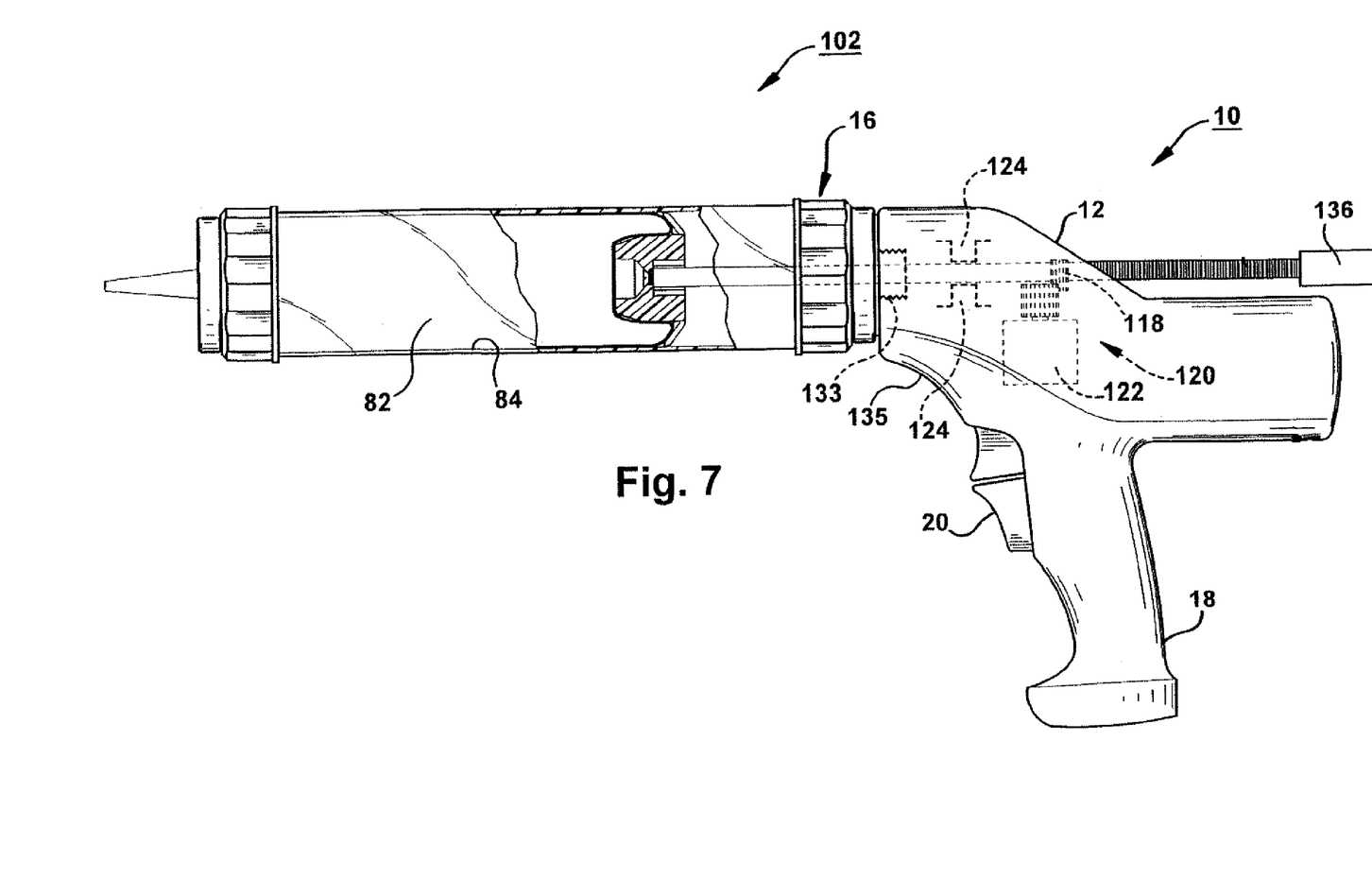
FIG. 7 is a side view of a power dispensing gun adapted to support the material dispensing assembly of FIG. 6.

Cartridges 12 are not the only form of container for holding material used by the dispensing guns 10, 30, but another known type of container is a sausage pack or bag-type container 50 shown in FIG. 4. The sausage pack 50 includes a first and second ends 52, 54, respectively extending from a main body 56 having dispensing material therein. The sausage pack 50 is positioned in a housing tube 58 located on the guns 10, 30 in place of the cartridge support sleeves 14, 32, respectively as illustrated in FIGS. 5 and 7. The sausage pack 50 once inserted into the guns has an opening 60 (shown in phantom is typically formed from removal of a containment ring or by piercing the sausage pack) toward the nozzle 22, 40 and the plunger 20, 38 squeezes the material out the nozzle when the trigger 16, 34 is engaged.

One example of a dispensing tool having interchanging support sleeves includes U.S. patent application Ser. No. 11/973,242 filed on Oct. 5, 2007 entitled DISPENSING TOOL that is assigned to the assignee of the present invention and is incorporated herein by reference in its entirety for all purposes. The '242 application illustrates a system for interchanging support sleeves from a cartridge-type dispenser to a sausage pack dispenser and vice versa as desired by the operator on a single power dispenser.

Sausage packs 50 are typically more economical because of their cheaper fabrication. As a result, the sausage packs 50 are typically used more frequently in high volume commercial and manufacturing operations over conventional cartridges 12 in material dispensing guns.

SUMMARY

One example embodiment of the present disclosure includes a material dispensing assembly for converting a portable cartridge dispensing tool to a bag-type dispensing tool. The assembly comprises a single piece piston for advancing material though a material housing. The single piece piston includes a substantially square-shaped receptacle. The assembly further comprises a square shaped drive rack for attaching to the piston at the substantially square-shaped receptacle at a connection end. The drive rack further comprises a plurality of teeth located thereon. The assembly further has a support with a substantially square profile for receiving and supporting the drive rack during operation such that the construct of the drive rack and piston are prevented from rotating during operation.

Another example embodiment of the present disclosure includes a single-piece piston for advancing material in a dispensing gun. The piston comprises first and second ends, the first end having a dome profile with an annular taper extending outwardly toward the second end. The piston further comprises a circular seal lip integral with and extending about the perimeter of the piston, the circular seal lip includes a plurality of substantially equal segments located therebetween. A noncircular attachment aperture is located in the piston for attaching the piston to a dispensing gun. The noncircular attachment aperture in the piston prevents loosening and rotation of the piston during operation.

A further example embodiment of the present disclosure includes a material dispensing gun assembly comprising a single piece piston for advancing material though a material housing. The single piece piston includes a substantially square-shaped receptacle for attaching the single piece piston to a dispensing gun and first and second ends. The first end includes an annular dome profile with first and second annular tapered surfaces extending outwardly toward the second end. The piston further comprises a circular seal lip integral and extending from the second annular tapered surface about the perimeter of the piston, the circular seal lip further comprises a plurality of substantially equal segments. The dispensing gun assembly also comprises a square shaped drive rack for attaching to the single-piece piston at the substantially square-shaped receptacle at a connection end and a plurality of teeth located thereon. The dispensing gun also includes a support having a substantially square profile for receiving and supporting the drive rack during operation such that the construct of the drive rack and piston are prevented from rotating during operation.

A yet further example embodiment of the present disclosure includes a method of dispensing material from a material dispensing gun comprising loading a sausage bag comprising dispensing material into a tube removably attached to a dispensing gun, the tube having an exit end from which the dispensing material is dispensed during operation. The method also comprises locating the sausage bag between the exit end and a single piece piston in the tube and engaging the sausage bag with an annular dome located at a front end of the single piece piston located in the tube. The method further comprises advancing the single piece piston against the sausage bag with a rack fixedly attached to the single piece piston such that material located in the sausage bag engaged by the annular dome is dispensed from the exit end of the tube and unadvanced material not engaged by the annular dome extends over first and second tapered annular surfaces of the dome. The method also includes engaging the unadvanced material in the sausage bag with a circular seal lip integral and extending from the second annular tapered surface about the perimeter of the piston, the circular seal lip comprises a plurality of substantially equal segments located about the perimeter of the circular seal lip and advancing the unadvanced material with the plurality of substantially equal segments of the single piece piston such that the unadvanced material located in the sausage bag engaged by the plurality of segments is dispensed from the exit end of the tube.

Another example embodiment of the present disclosure includes a material dispensing housing for use with bag-type dispensing material. The material dispensing housing comprises a transparent tube for supporting bag-type dispensing material, the tube is formed from high-temperature resistant polymeric material. The transparent tube allows for the visualization of the movement of dispensing material located within the housing during operation. The housing also comprises a base coating selected from one of a silicone coating and polysiloxane coating. The base coating provides superior service life and reduced friction of the bag holding the dispensing material and reduces the friction with a piston that engages the tube and the bag-type dispensing material during operation.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein like reference numerals refer to like parts throughout the drawings and in which.

DETAILED DESCRIPTION

Figure 6:
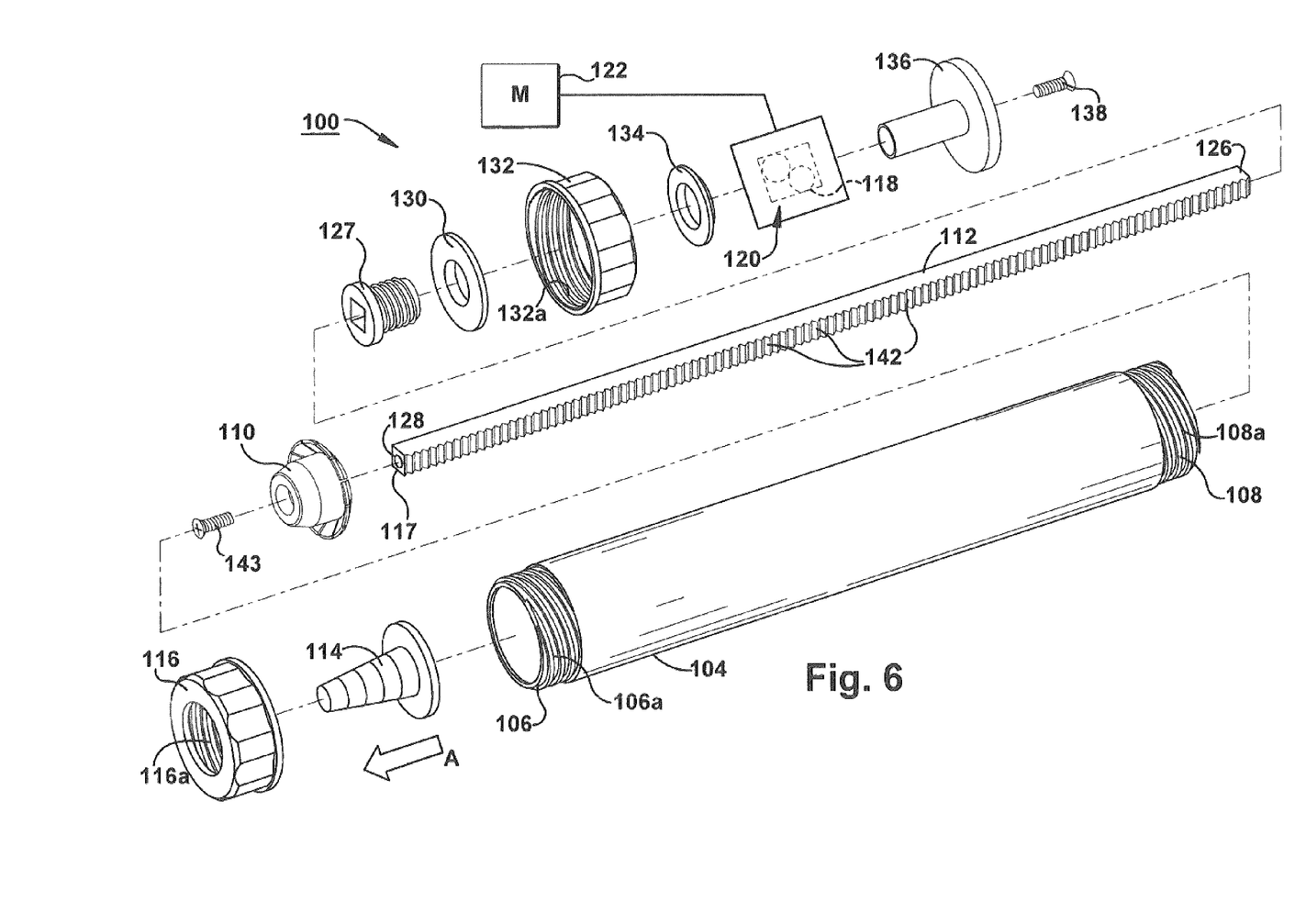
FIG. 6 is an exploded assembly view of a material dispensing assembly adapted for a power dispensing tool constructed in accordance with one embodiment of the present disclosure.

The present disclosure relates to a material dispensing assembly 100, and more particularly, a material dispensing assembly for easily converting portable cartridge dispensing tools to sausage or bag-type dispensing tools. One example embodiment of the material dispensing assembly 100 is illustrated in FIG. 6. The assembly 100 can be adapted to convert a power dispensing tool from the cartridge-type dispenser illustrated in FIG. 3 to that of a sausage type dispenser as illustrated in the example embodiment of the power dispensing tool 102 in FIG. 7 that can be powered by battery, pneumatic means, and the like.

The power dispensing assembly 100 of FIG. 6 comprises a sausage holding tube 104 having first and second ends 106, 108, respectively. A sausage pack 50 of various lengths is installed through the first end 106 and material within the sausage pack is forced out by a piston 110 that is located behind the sausage pack in the second end 108 during operation. The material that is dispensed from the sausage pack 50 could include caulk, adhesives, silicone, urethanes, and the like without departing from the spirit and scope of the claimed invention. The piston 110 is advanced by a square piston rack 112, which forces the piston against the sausage pack 50, forcing material to dispense from the first end 106 through a nozzle 114 that is retained to the tube 104 by a cap 116 via a threaded connection 117.

The amount and speed of the material dispensed from the sausage pack 50 by the piston 110 could be a function of the speed of the motor (internal to the gun), or the extent of travel by the piston in the tube 104. For example, the piston 110 could "bottom-out" against an empty sausage pack 50 that is compressed against the cap 116 and nozzle 114. The rack 112 moveably passes through components internal to the gun 102, including a pinion gear 118 (that engages and drives the rack in both forward and reverse directions) coupled to a gear set 120 driven in both a forward and reverse direction by a motor 122. The positioning of the gear set 120 and pinion gear 118 in combination with supports 124 internal to the gun 102, fix the orientation of the rack 112 through its path of travel when advancing and reversing the piston 110 in the tube 104. The supports 124 comprise square shaped bushings, guides, or fixtures that maintain the orientation of the rack 112 to prevent rotation of the rack or piston 110 during operation.

The rack 112 includes first 126 and second 128 ends. The first end 126 passes through a barrel screw 127, spacer 130, end cap 132, and washer 134. The barrel screw 127 couples the dispensing assembly 100 through the spacer 130 and end cap 132 to a mating threaded connection 133 located in a housing porting 135 of the gun 102 for engagement with the barrel screw. Attached to the first end 126 of the rack 112 is a rack handle 136 for assisting in the reloading and unloading of the sausage packs 50 from the tube 104. The rack handle 136 is secured to a threaded aperture located in the first end 126 of rack by a screw 138.

The first and second ends 106, and 108, respectively have respective threaded sections 106A and 108A. The first threaded section 106A co-acts with internal threads 116A associated with cap 116 and secures the cap to the first end 106 of the tube 104, locking the nozzle 114 between the tube and cap at the first end. The second threaded section 108A co-acts with internal threads 132A associated with end cap 132. Once the end cap 132 is secured to the housing 135 of the dispensing gun 102, as described above, the second threaded second 108A is screwed into the end cap, thereby supporting the tube 104 to the housing.

Plungers 20 used in conventional dispensing guns (see FIG. 1), are commonly threaded on the end of a drive rack 18. Tightening the plunger 20 to the rack and applying a lock-nut is a typical means of securing the plunger. As some cartridges 12 and their corresponding support sleeves are designed to be rotated, the tendency to have the plunger 20 "unscrew" from the drive rack is appreciable, especially during operations when the user is attempting to turn the cartridge 12 while there is axial pressure being applied to the drive rack.

Figure 8A:
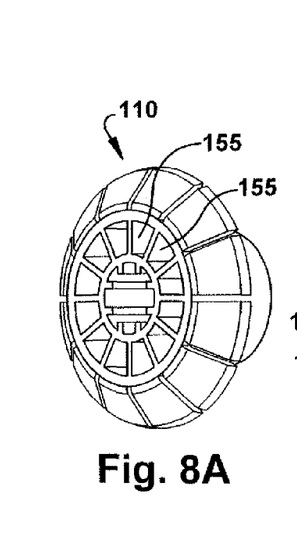
FIG. 8A is a rear isometric view of a single piece piston constructed in accordance with one embodiment of the present disclosure.

Such problems are resolved by one embodiment of the present invention. In particular, the rack 112 comprises a square configuration to be received and attached to a corresponding a square receptacle 140 in the piston 110, as illustrated in FIGS. 8A, 8C, and 8F. The rack 112 engages the receptacle until it is in contact with an internal face 141 in the piston 110 and is secured to the piston by a fastener 143 that passes through an opening 165 into a counter-bore 167, for seating the fastener during attachment. Such design and the corresponding square supports 124 internal to the gun 102 prevent rotation of the rack 112 and preclude any loosening of the piston 110.

The rack 112 construction in the illustrated embodiment of FIG. 6 provides yet another advantage from the present disclosure. The square piston 110, corresponding square receptacle 140, and rack 112 allow the rack to be reversed such that the first end 126 can be flipped with the second end 128. This reversible rack 112 feature is advantageous when the rack becomes worn by the pinion gear 118 along an advanced direction (see arrow A in FIG. 6). At such time that the rack 112 shows signs of wear, the mirror image construction and corresponding attachments allow the rack to be flipped 180 degrees between the first and second ends 126, 128 while remaining in the same orientation as shown in FIG. 6. The pinion 1118 now drives unworn teeth 142 in the advanced direction "A". The fasteners 138, 143 and receiving threaded connections in the rack 112 at first and second ends 126, 128 are the same, allowing the piston 110 and rack handle 136 to be reversed, extending the life of the rack as discussed above.

The piston 110 provides several advantages illustrated in the exemplary embodiment of FIGS. 6 and 8. While conventional plungers 20 are typically configured from multiple pieces, the piston 110 is a single uniform piece made from a single molding operation. This eliminates both material and assembly costs experienced in conventional plunger designs. While the piston 110 can be made from any number of suitable polymeric materials, the construct of the piston in the example embodiment is formed from Nylon 66 material. The polymeric material of the piston 110 advantageously weighs less than one ounce, while compared to conventional plungers that weigh much more and up to eight ounces. The reduction in weight in the exemplary embodiment of the single piece piston 110 reduces stress, strain, and other ergonomic issues typically experienced in wrists and arms of operators using conventional dispensing guns.

Figure 8B:
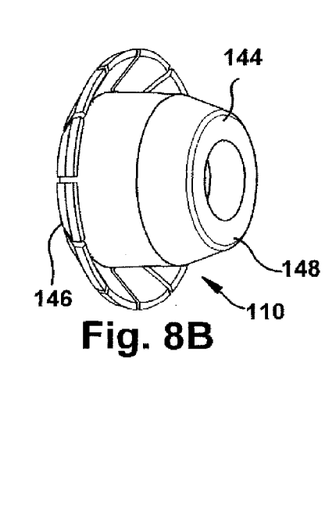
FIG. 8B is a front isometric view of the single piece piston constructed in accordance with the example embodiment of FIG. 8A.
Figure 8C:
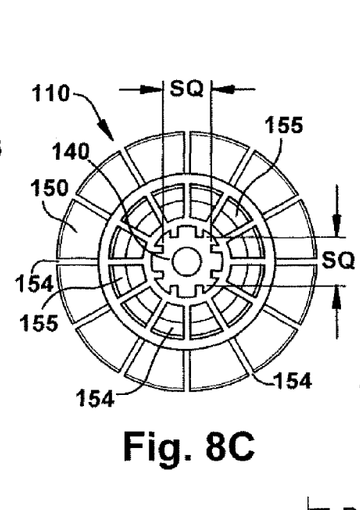
FIG. 8C is a rear elevation view of the single piece piston constructed in accordance with the example embodiment of FIG. 8A.
Figure 8D:
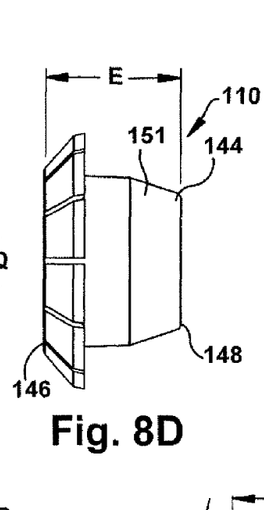
FIG. 8D is a side elevation view of the single piece piston constructed in accordance with the example embodiment of FIG. 8A.
Figure 8E:
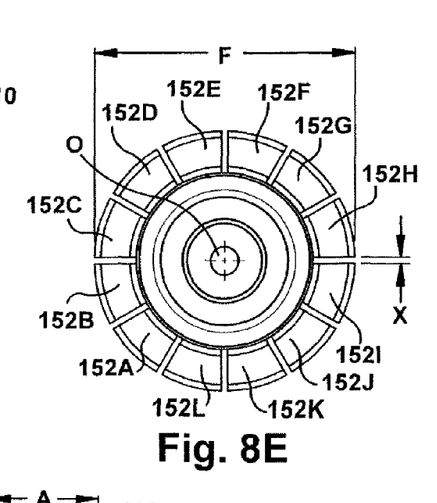
FIG. 8E is a front elevation view of the single piece piston constructed in accordance with the example embodiment of FIG. 8A.
Figure 8F:
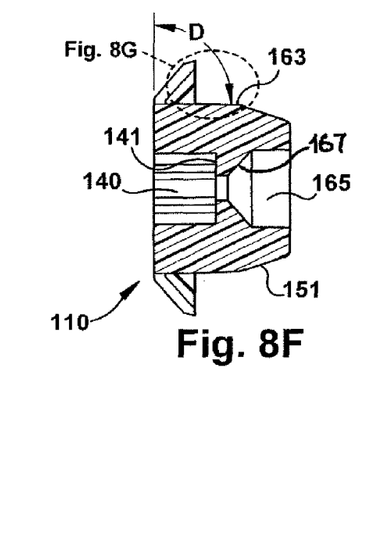
FIG. 8F is a cross-section elevation side view of the single piece piston constructed in accordance with the example embodiment of FIG. 8A.

The piston 110 comprises front 144 and back 146 ends as shown in FIGS. 8B and 8D, an annular dome 148, and circular lip portion 150, as shown in FIG. 8C. The construct of the annular dome 148 at the front 144 of the piston 110 is designed to extrude the maximum amount of material from the tube 104 and sausage packet 50 therein. In particular, the dome 148 comprises a first tapered annular surface 151, raising the unadvanced material in the sausage packet 50 up over the tapered annular face to a plurality of segmented sections 152 integrated into the dome and extending from the single piece piston 110. In the illustrated embodiment, twelve (12) segmented sections represented by 152A-152L (see FIG. 8E) in the circular lip portion 150 capture and advance forward the remaining material in the sausage packet 50 as the piston 110 advances through the tube 104. While twelve segmented sections 152 are shown in the illustrated embodiment of FIG. 8, more or less segmented sections could be used without departing from the spirit and scope of the claimed invention.

Figure 8G:
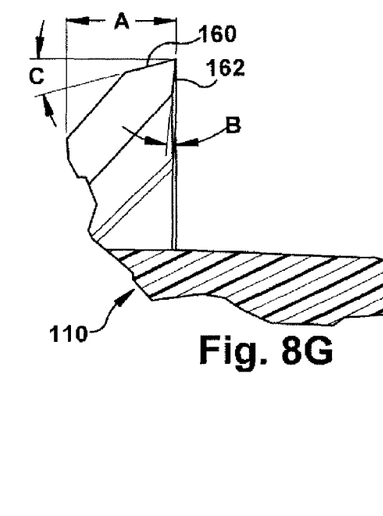
FIG. 8G is a magnified view of a portion of the single piece piston cross-section identified in the example embodiment of FIG. 8G.

The independent flexibility achieved by the segmented sections 152A-152L provide a heightened ability to facilitate a solid lip seal to a tube 104 or cartridge 12 internal wall under varying roundness tolerances especially experienced in cartridge tubes. Further the specific piston 110 diameter, piston lip geometry, including thickness, taper, and edge angles provide dispensing free of "bag wrap" failures, while enabling a low "pull back" force in sausage-type applications. In addition, the piston 110 design provides a low drag force in the forward direction (see arrow A in FIG. 6), enabling greater dispensing forces to be achieved. In the illustrated embodiment of FIGS. 8A-8G, the lip thickness represented by dimension "A" in FIG. 8G is approximately 0.34 inches, having a front taper 162 of approximately 6 degrees represented by dimension "B", and edge angle off a rear edge 160 of each segmented sections 152 of approximately 15 degrees represented by dimension "C", and a back angle off a second tapered annular surface 163 on the dome 151 of approximately 92 degrees represented by dimension "D", as illustrated in FIGS. 8F and 8G.

The twelve segmented sections 152A-152L are capable under the current embodiment of FIG. 8 of independently undulating to maintain substantially constant regulated pressure to the sausage pack 50, preventing bag wrap failures where the bag of the sausage pack 50 would pinch between the plunger and tube in conventional plunger designs. In the exemplary embodiment of FIGS. 8A-8G, a vent spacing 154 is provided between the 12 segmented sections 152A-152L of approximately 0.030 inches represented by dimension "X" in FIG. 8E. The overall length of the piston is approximately 1 inch represented by dimension "E" in FIG. 8D and the overall diameter of the piston 110 in the illustrated embodiment of FIG. 8 is approximately 2.0 inches as illustrated in FIG. 8E by dimension "F", and the segmented sections extend from the dome 151 outward at approximately 0.69 inch diameter radius from the center "O" of the piston. It should be appreciated however, that proportionally larger and smaller dimensions would be required for larger and smaller diameter tubes and are intended to be covered by the spirit and scope of the claimed invention.

The vent spacings 154 in addition to providing independent pressure to the inner diameter of the tube 104 and/or sausage pack 50, allow air to escape from the tube when the sausage pack is being inserted or removed. This allows for easier replacement and removal of sausage packs 50 during operation by the user. The piston 110 also comprises a number of voids on the back end 146. The voids 155 improve the overall structural strength and facilitate a reduction in the weight of the piston 110.

The tube 104 in one exemplary embodiment is transparent so that the material dispensed from the sausage pack 50 can be observed and visually measured by the user. In addition, the transparent tube 104 allows the user to visually inspect the tube while performing a cleaning operation.

In another example embodiment, the tube 104 is transparent (i.e. clear and chemical resistant) and made from an a high temperature annealed polycarbonate or polyamide based material 82 and lined with a based coating 84, allowing superior service life in a demanding environment of repeated stress, thermal, and chemical attack. Examples of suitable base coatings include silicone or polysiloxane. Such construction also reduces friction with the piston 110 and sausage bag 50 and reduces the force necessary for dispensing the material from the dispensing gun 102. The base coatings 84 can be applied to the tube 104 by direct application, such as spraying or wiping the internal portions of the tube, through a heat treatment application process, or by extruding or impregnating the base material 82 with the base coating material during the forming of the base material.

What have been described above are examples of the present invention. It is, of course, not possible to describe every conceivable combination of components or methodologies for purposes of describing the present invention, but one of ordinary skill in the art will recognize that many further combinations and permutations of the present invention are possible. For example, while the material dispensing assembly was illustrated being adapted to a power dispensing gun, it could equally be adapted to a manual dispensing gun without departing from the spirit or scope of the claimed invention. Accordingly, the present invention is intended to embrace all such alterations, modifications, and variations that fall within the spirit and scope of the appended claims.

The invention claimed is:

1. A material dispensing assembly for converting a portable cartridge dispensing tool to a bag-type dispensing tool, the assembly comprising:
a single piece piston for advancing material though a material housing, the single piece piston having a substantially square-shaped receptacle;
a square shaped drive rack for attaching to said piston at said substantially square-shaped receptacle at a connection end and a plurality of teeth located thereon; and
a support having a substantially square profile for receiving and supporting said drive rack during operation such that the construct of said drive rack and piston are prevented from rotating during operation;
wherein said single piece piston further comprises first and second ends, the first end having a dome profile with an annular taper extending outwardly toward said second end and a circular seal lip integral with and extending from said annular taper about the perimeter of the piston, the circular seal lip comprising a plurality of substantially equal segments.

2. The assembly of claim 1 wherein said material dispensing assembly is one of a manually operated dispensing assembly and power operated dispensing assembly.

3. The assembly of claim 1 wherein said support includes at least one fixture for supporting the orientation of said drive rack, the at least one fixture being an internal component in said dispensing assembly.

4. The assembly of claim 1 wherein said drive rack is reversibly interchangeable.

5. The assembly of claim 1 wherein said material housing is made from one of polyamide and polycarbonate material.

6. The assembly of claim 5 wherein said material housing is transparent and coated with one of a silicone based coating and a polysiloxane coating.

7. The assembly of claim 5 wherein said one of polyamide and polycarbonate material is formed from an annealing process.

8. A single-piece piston for advancing material in a dispensing gun comprising:
first and second ends, the first end having a dome profile with an annular taper extending outwardly toward said second end;
a circular seal lip integral with and extending from said annular taper about the perimeter of the piston, the circular seal lip comprising a plurality of substantially equal segments; and
a noncircular attachment aperture for attaching said piston to a dispensing gun.

9. The single-piece piston of claim 8 further comprising a plurality of support voids.

10. The single-piece piston of claim 8 wherein said piston is molded from a polymeric material.

11. The single-piece piston of claim 8 wherein said annular taper comprises first and second taper portions, the first taper portion originating at said first end and a second taper portion originating at an end of the first taper portion and extending to said circular seal lip at said second end, the first taper having a greater incline angle than said second taper.

12. The single-piece piston of claim 8 wherein said plurality of segments forming said circular seal lip are formed by a vent spacing between each of said segments, said vent spacing providing independent movement between each of said segments during operation.

13. A material dispensing gun assembly comprising:
a single piece piston for advancing material though a material housing, the single piece piston comprising:
a substantially square-shaped receptacle for attaching said single piece piston to a dispensing gun;
first and second ends, the first end having an annular dome profile with first and second annular tapered surfaces extending outwardly toward said second end;
a circular seal lip integral with and extending from said second annular tapered surface about the perimeter of the piston, the circular seal lip further comprising a plurality of substantially equal segments;
a square shaped drive rack for attaching to said single-piece piston at said substantially square-shaped receptacle at a connection end and a plurality of teeth located thereon; and
a support having a substantially square profile for receiving and supporting said drive rack during operation such that the construct of said drive rack and piston are prevented from rotating during operation.

14. The material dispensing gun assembly of claim 13 wherein said single piece piston further comprises a vent area between each of said segments and a front taper extending from an outer portion of said segments toward said first end and tapering toward said second end near an inner portion of said segments in contact with the second tapered annular surface.

15. The material dispensing gun assembly of claim 13 wherein said first annular tapered surface originates at said first end and said second annular tapered surface originates at an end of the first annular tapered surface opposite the origination end of the first annular tapered surface and extends to said circular seal lip at said second end, the first taper having a greater incline angle toward a center of the annular dome profile than said second taper.

16. The assembly of claim 13 wherein said material housing is made from one of polycarbonate and polyamide material.

17. The assembly of claim 13 wherein said drive rack is reversibly interchangeable.

18. The assembly of claim 16 wherein said polycarbonate or polyamide material is annealed.

* * * * *